Sept. 6, 1955 F. J. REED 2,717,282

EQUIPMENT FOR USE WITH MAGNETIC TAPE RECORDS

Filed July 15, 1953 4 Sheets-Sheet 1

INVENTOR
Frank J. Reed
BY
ATTORNEYS

EQUIPMENT FOR USE WITH MAGNETIC TAPE RECORDS

Filed July 15, 1953 4 Sheets-Sheet 2

INVENTOR
Frank J. Reed
BY
Synnestvedt & Lechner
ATTORNEYS

EQUIPMENT FOR USE WITH MAGNETIC TAPE RECORDS
Filed July 15, 1953 4 Sheets-Sheet 3
Fig. 4.
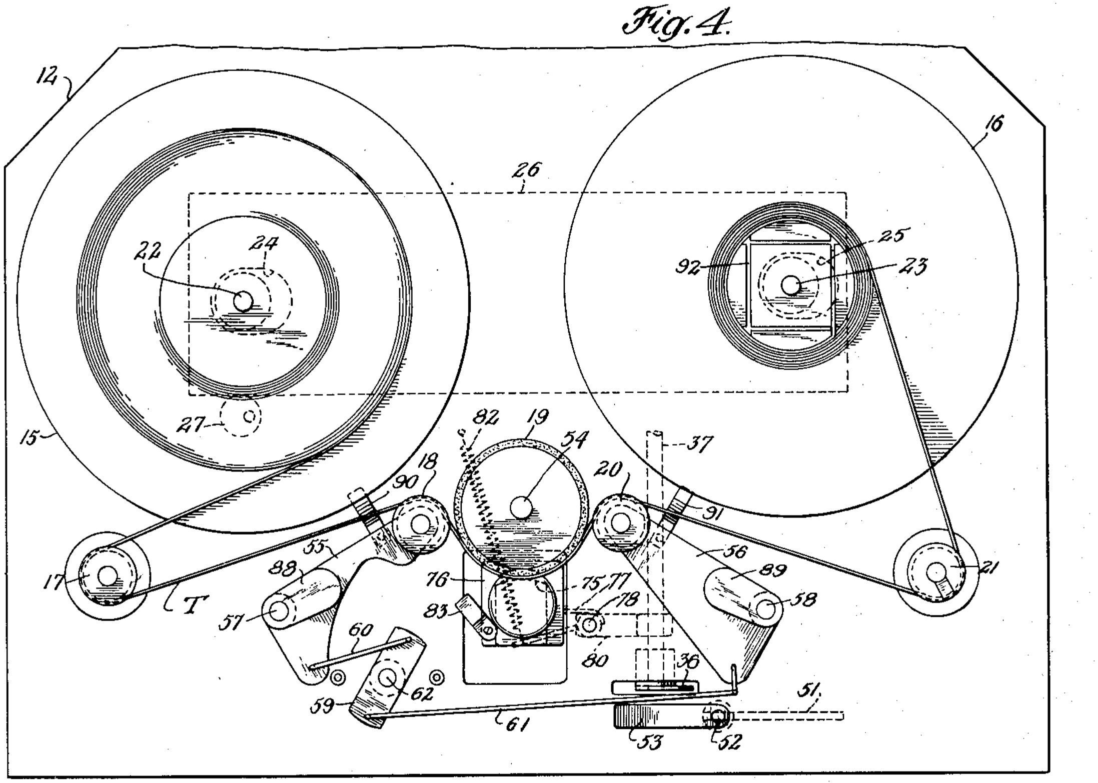
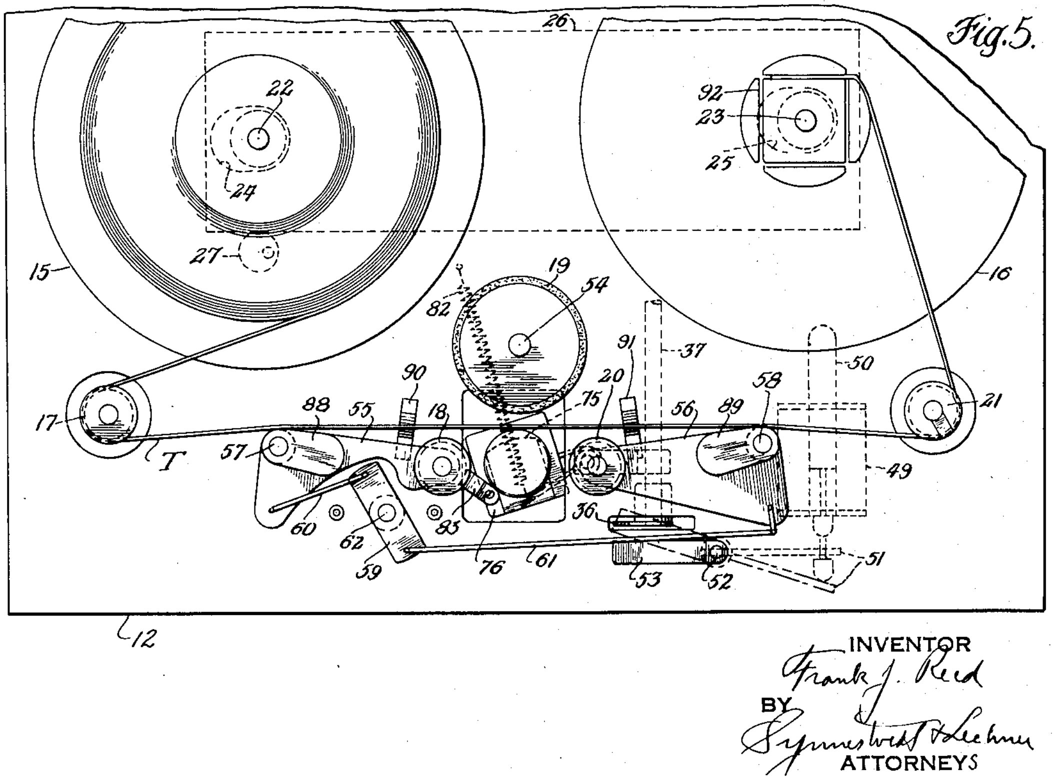
INVENTOR
Frank J. Reed
BY
Pynnestvedt & Lechner
ATTORNEYS

EQUIPMENT FOR USE WITH MAGNETIC TAPE RECORDS

Filed July 15, 1953

4 Sheets-Sheet 4

INVENTOR
Frank J. Reed
BY
Sylvester & Liebner
ATTORNEYS

United States Patent Office 2,717,282

Patented Sept. 6, 1955

2,717,282

EQUIPMENT FOR USE WITH MAGNETIC TAPE RECORDS

Frank J. Reed, Philadelphia, Pa., assignor to The International Electronics Company, Philadelphia, Pa., a corporation of Pennsylvania

Application July 15, 1953, Serial No. 368,172

16 Claims. (Cl. 179—100.2)

This invention relates to equipment for use with magnetic tape records, and is particularly concerned with mechanism for handling elongated tape records either for recording or for reproduction thereof, for instance records of the type adapted to be stored on reels.

Although the invention is adaptable to tapes carrying recorded intelligence of a variety of types, the invention is particularly useful in the handling of tape records carrying recorded music. A typical record of this type may carry the recording of a complete symphony requiring as much as an hour for playback.

It is also here noted that while many features of the invention are useful with tape recordings of a variety of types, certain features of the invention are particularly concerned with that type of tape recording carrying a plurality, for instance two, tracks of recorded music or the like, one track being oriented for reproduction upon scanning of the tape in one direction, and another track being oriented for reproduction upon scanning of the tape in the opposite direction. A machine of this general type is disclosed in copending application of Bruce Roberts Serial No. 715,518 filed December 11, 1946, issued January 13, 1953, as Patent 2,625,611, and assigned to the assignee of the present application.

The present invention has, as a general object, the provision of improvements in the structure and operation of machines of the type referred to.

One of the principal individual objects of the invention is to simplify the operation of equipment for handling elongated magnetic records, especially records in tape form, for instance in the form of a paper tape carrying a coating having magnetizable particles dispersed therein. According to the invention the matter of threading a tape record in the equipment is greatly simplified as compared with prior arrangements, the machine of the present invention being alternatively conditionable for threading and for normal operation. When conditioned for threading, a substantially straight line threading path is provided into which the tape may be inserted with great ease; and when the machine is adjusted for operation, various guiding devices and the like automatically come into engagement with the tape to establish the desired feed path for operation.

Another object of the invention is to provide automatic means for reversing the direction of scanning of a tape record.

Still further the invention provides automatic shutoff means operative upon completion of a cycle of reproduction.

How the foregoing and other objects and advantages are attained will appear more fully from the following description referring to the accompanying drawings in which—

Figure 4 is a view of certain portions of the mechanism shown in Figure 1, also illustrated in plan, but with certain parts omitted;

Figure 5 is a view similar to Figure 4 but illustrating a different position of adjustment of certain guide and other devices;

Figure 1:
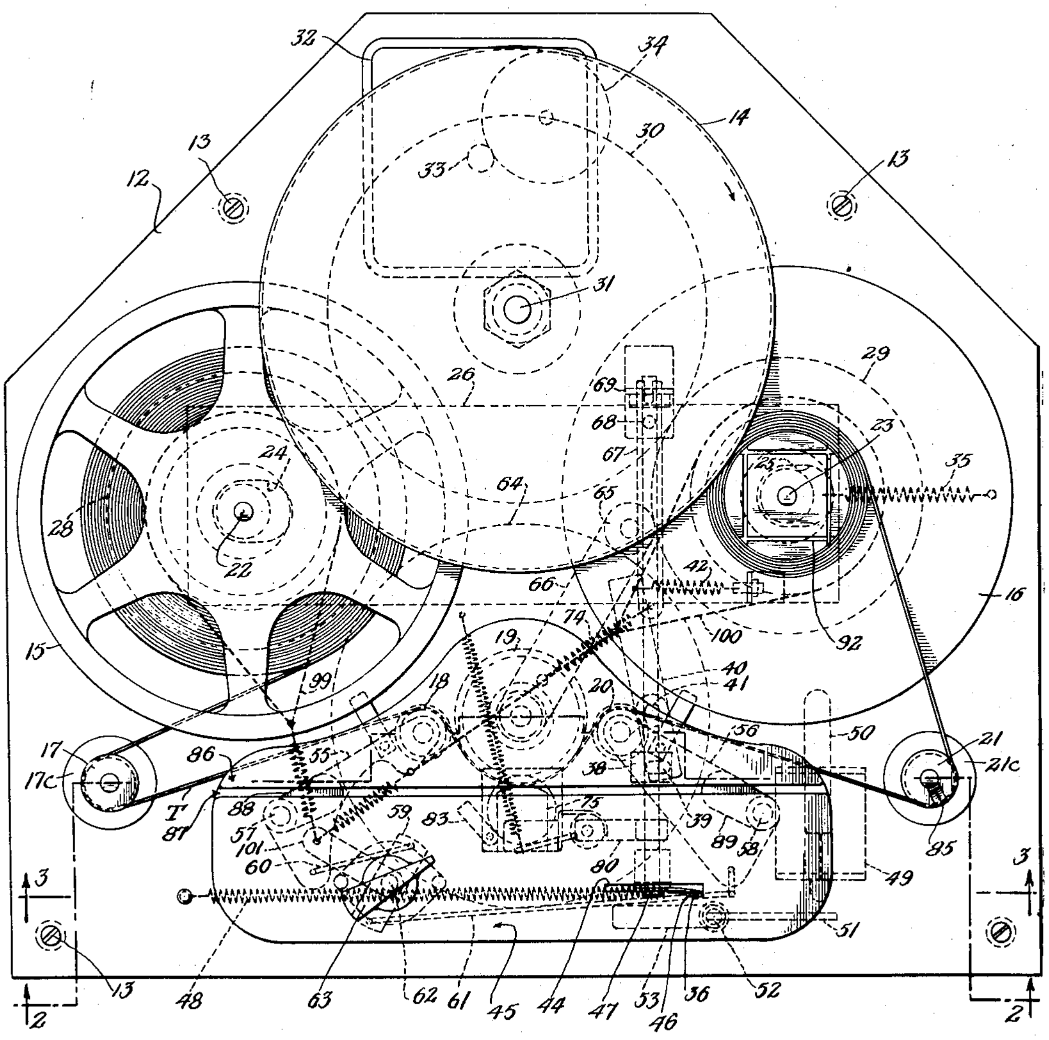
Figure 1 is a plan view of a machine constructed according to the present invention.

As shown in the drawings the equipment is mounted upon a frame or base plate 12 carried by standards 13. When viewed in plan, as in Figure 1, the general arrangement of some of the major components will be seen. Thus, the machine incorporates a turntable 14 adapted to be employed to support and drive disc type mechanical recordings. A pair of tape reels 15 and 16 are mounted on vertical axes, partially underneath the turntable 14. A magnetic tape record T is adapted to be fed between the reels, the feed path being defined by guide elements 17, 18, 19, 20 and 21.

As with the machine disclosed in the copending application above referred to, it is contemplated that the machine as a whole shall include disc record playing facilities, magnetic tape record playing facilities, a radio broadcast receiver, means for alternatively recording on a tape record intelligence received through the radio broadcast receiver or intelligence reproduced from a disc record. However, since the improvements of the present invention are not related to the hook-up, such as electric circuits, etc., of the recording and reproducing elements, they are not herein disclosed, although reference may be made to the copending application above referred to for further information with regard to such a hook-up. On the other hand, the features of the invention are related to the physical arrangement of parts and devices of the equipment, especially those parts of the apparatus which are arranged to handle the magnetic tape record.

Each of the tape reels 15 and 16 is provided with a mounting spindle, one being indicated at 22 and the other at 23. These spindles extend downwardly through the base plate 12 through oversized and elongated apertures 24 and 25 and are journalled in bearings supported by a horizontally shiftable mounting plate 26. The apertures 24 and 25 serve to guide the plate 26 for lateral shifting, i. e., to the left or right when viewed as in Figures 1, 2 or 6. An eccentrically adjustable device 27 also acts as a guide element for the plate, in the manner described herebelow.

Figures 6, 7, 8, 9, 10:
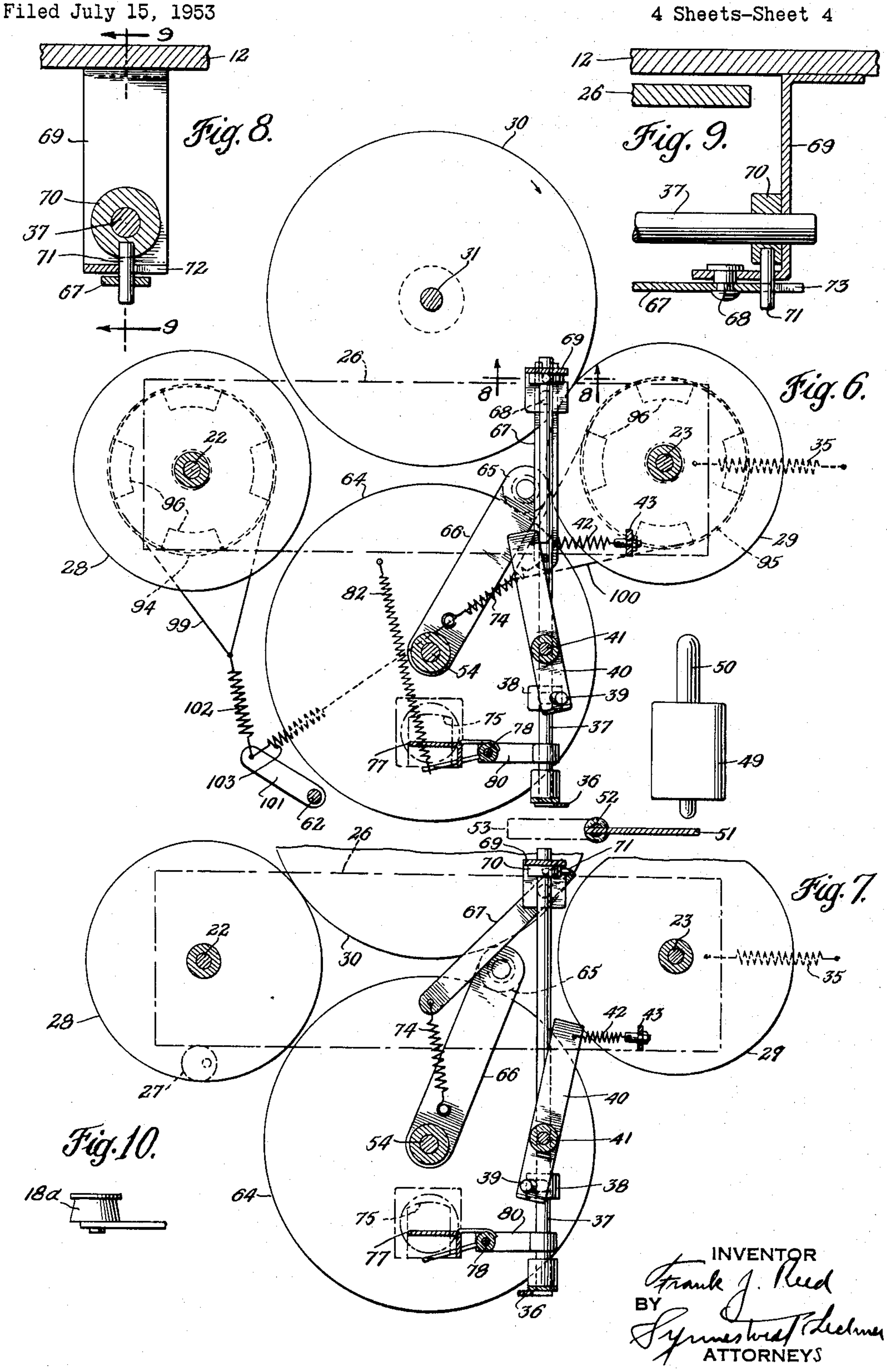
Figure 6 is a horizontal sectional view taken substantially as indicated by the section line 6—6 on Figure 2.
Figure 7 is a view of certain parts shown in the same general manner as in Figure 6, but with certain control devices adjusted to a different position.
Figure 8 is a fragmentary view of certain details, taken as indicated by the section line 8—8 on Figure 6, but on an enlarged scale.
Figure 9 is a view taken as indicated by the section line 9—9 on Figure 8.
Figure 10 is a fragmentary view of a modified form of guide element for the tape record.

The tape reels 15 and 16 are adapted to be driven by means of friction discs 28 and 29 which are mounted on the reel spindles 22 and 23, the discs being connected with the shafts through friction clutches described hereinafter. These friction discs are adapted alternatively to be brought into engagement with a driving disc 30 which is fixed on the shaft 31 of the turntable 14. The turntable is provided with a driving motor diagrammatically indicated at 32, the motor shaft 33 engaging a driving puck 34 which latter also engages the turntable at the marginal flange thereof. The drive to the reels 15 and 16, therefore, is transmitted through the turntable 14 to the disc 30 and from there alternatively to disc 28 or disc 29, according to the position of the shiftable plate 26. The plate 26 is biased toward the right when viewed as in Figures 1 and 6 by means of a spring 35. Movement of the plate to the left is effected by a control lever 36 (see particularly Figures 3, 6 and 7), which lever is connected with control shaft 37 having a collar 38 fixed thereon which collar carries a pin 39 engaging an aperture in a lever 40 toward one side of the vertical mounting pivot 41. A spring 42 interconnects the other end of lever 40 with the shifting plate 26, the spring being connected with the plate through a bracket 43. Movement of the lever toward the left when viewed as in Figure 3 causes lever 40 to pivot in a direction to tension spring 42, and the relative values of springs 35 and 42 are so chosen that in this position the spring 42 overcomes the action of spring 35 and as a result the shifting plate 26 is moved to the left, thereby bringing friction disc 29 of reel 16 into engagement with the driving disc 30 on the turntable spindle. When the lever 36 is moved to the left, as shown in Figure 7, the lever 40 is pivoted so as to relieve the tension on spring 42 and thereby permit spring 35 to draw the shift plate 26 to the right and thereby disengage friction disc 29 and bring friction disc 28 of reel 15 into engagement with the driving disc 30.

The control lever 36 extends upwardly from the control shaft 37 through an elongated slot formed in the base plate 12 and also through slot 44 in an upper cover plate 45 referred to more fully herebelow. Slot 44, as seen in Figure 1, is provided with a notch 46 adapted to retain the lever 36 in the right hand position. This slot is further provided with an intermediate notch 47 for maintaining the lever 36 in an intermediate position. The lever constitutes a spring member normally tending to engage itself in one or the other of notches 46 and 47.

As above brought out, the right hand position of the lever effects drive of the tape reel 16, and the left hand position of the lever effects drive of the tape reel 15. The intermediate position, defined by notch 47 represents a neutral setting in which neither of the tape reels is driven.

For purposes which will appear more fully herebelow, the lever 36 is biased toward the left hand position by means of a spring 48. Movement of the lever from the left hand position either to the neutral position or to the right hand position requires manual setting. A trip mechanism is also provided for disengaging the lever from the notch 46 in the right hand position. This trip mechanism comprises a solenoid 49 having an armature 50 which is adapted to deliver a blow to one arm 51 of a double-armed lever pivoted on shaft 52, the other arm 53 of this lever being arranged to transmit the blow to the control arm 36, to thereby disengage it from notch 46, whereupon spring 48 will draw the lever to the left end of the slot 44 and cause the tape reel 15 to be driven instead of the tape reel 16. Control means for the solenoid 49 are referred to hereinafter.

Reference is now made to the elements defining the tape path between the reels 15 and 16. As above mentioned the tape is first led from reel 15 around a guide post 17, which may either be rotative or fixed, preferably the latter. A similar post 21 constitutes the last element over which the tape passes before being wound upon the reel 16. In the portion of the path between the posts 17 and 21, the tape path is sinuous, being established by elements 18, 19 and 20. Element 19 is in the nature of a tape driving capstan mounted on a shaft 54 and driven in the manner described below. Elements 18 and 20 may constitute rollers or fixed guide elements, preferably the latter, one of which is mounted on a bellcrank 55 and the other on a bellcrank 56, the two bellcranks being pivoted at 57 and 58 respectively for movement between the position best shown in Figure 4 and the position illustrated in Figure 5. In the position of Figure 4 the guide elements 18 and 20 cause the tape T to engage the driving capstan 19 over a substantial portion of the circumference of the capstan. In the position shown in Figure 5 the elements 18 and 20 are withdrawn completely out of engagement with the tape, so that the tape may at this time extend in a substantially straight run from the guide post 17 all the way across the machine to the guide post 21. This is a feature of importance, since it provides for threading of a tape into the machine in a substantially straight line path throughout that portion of the overall path from reel to reel which normally is sinuous, and in which various other devices are adapted to engage the tape. Threading of the machine is thereby greatly facilitated.

Oscillation of the bellcranks 55 and 56 is effected by means of a double-armed lever 59 one end of which is linked as at 60 with bellcrank 55 and the other end of which is linked as at 61 to the bellcrank 56. Oscillation of lever 59 about its mounting shaft 62 thus provides for swinging of the bellcranks 55 and 56 from the position shown in Figure 4 to the position shown in Figure 5 or vice versa. Shaft 62 of the lever 59 is provided with a control knob 63 by which the shaft may be manually oscillated to alternatively condition the machine for threading or for operation.

When the machine is in operation the capstan 19 (which is preferably surfaced with a material having a relatively high coefficient of friction so as to prevent slippage of the tape thereon) is driven through a friction disc 64 which is fixed on the capstan shaft 54 (see particularly Figures 6 and 7). The drive for the capstan disc 64 includes an intermediate friction roller 65 which is journalled at the free end of an oscillatable lever 66. When the shift plate 26 is in its left hand position when viewed as in Figure 6 the intermediate friction drive element 65 is adapted to interconnect the disc 29 with the capstan disc 64. When the shift plate 26 is moved to the right, the intermediate friction element 65 is adapted to drivingly couple the capstan disc 64 directly with the driving disc 30 on the turntable shaft. Yielding friction pads are preferably provided on various of the friction discs and it is here pointed out that the senses of rotation of the several drive elements which serve to couple the capstan disc 64 with the driving disc 30 are such that the drive action is "self-energized," i. e., the driving force tends to tighten the intermediate friction element 65 into engagement with the capstant disc 64 and the disc 29 or the disc 30, depending upon the direction of drive of the capstan. This shiftable self-energizing drive is not a part of the present invention per se, being described and claimed in copending application of Bruce Roberts entitled Drive Mechanism for Magnetic Tape Record Machine, Serial No. 744,272, filed April 26, 1947, issued February 9, 1954, as Patent 2,668,674, and assigned to the assignee of the present application.

For reversal of the capstan drive, a toggle mechanism is utilized, whereby to yieldingly urge the intermediate drive element 65 into engagement with disc 29 or 30, depending upon the direction of drive. This mechanism includes an arm 67 (see Figures 6, 7, 8 and 9) which is pivoted at 68 to a fixed bracket 69 carried on the underside of the base plate 12. The bracket 69 also serves as a support for the inner end of the control shaft 37 and adjacent to the bracket 69 the control shaft has a collar 70 secured thereto which collar carries a pin 71 projecting downwardly through a slot 72 formed in the bracket 69 and engaging in another slot 73 formed in the inner end of shift lever 67. A spring 74 interconnects the free end of shift arm 67 with the arm 66 carrying the intermediate friction element 65. By this arrangement when the control shaft 37 is oscillated as by actuation of the control lever 36, the pin 70 causes the shift lever 67 to swing between the positions illustrated in Figures 6 and 7. In the position of Figure 6 the spring 74 is acting on arm 66 in a direction tending to urge the friction element 65 into engagement with disc 29; and in the position of Figure 7 the spring 74 is acting upon the arm 66 in a direction to urge the friction element 65 against the driving disc 30.

According to the foregoing the drives for both the tape capstan and the tape reels are concurrently reversed. When the shifter plate 26 is moved to the right when viewed as in Figures 6 and 7, the eccentrically adjustable device 27 serves to prevent engagement of drive disc 28 for reel 15 with the capstan drive disc 64.

Attention is now called to the fact that in the machine illustrated the tape is adapted to be scanned by a magnetic scanning head 75 yieldingly engaging the tape in the run thereof which is being driven by the capstan 19. This head is mounted on a plate 76 which is carried by a bracket 77, the bracket being pivoted for pivotal motion about an upright axis on a vertical pin 78. A spring 79 urges the head mounting bracket downwardly; and the head may be raised by a lever 80 secured to the control shaft 37, which lever is adapted to abut against the lower end of the pin 78. When the control lever 36 is adjusted to the right hand position as viewed in Figure 3, the magnetic head is elevated, and when the lever 36 is adjusted to the left hand position the magnetic head is lowered. These two head positions are intended to be employed in the scanning of a double-track tape record and the shifting of the head is coordinated with the capstan drive mechanism and also with the reel drive mechanism, so that a double-track tape may first be scanned in one direction and then in the other direction, with only a single control adjustment.

According to another feature of the invention, provision is made for automatically reversing the direction of tape drive, shifting the magnetic head, etc., at the end of the scanning of the tape in one direction. For this purpose the tape guide post 17 comprises a pair of electrically insulated contact elements **17*a* and 17*b* (see Figure 2) which are coupled, together with a source of current, with the solenoid 49 for tripping the control lever 36. The tape itself is non-conductive, but according to the invention a contact element such as indicated at 81, for instance a small piece of metal foil, is secured to the tape near the position where reversal of drive is desired, so that when the contact element 81 reaches the guide post 17 it interconnects the contacts 17*a* and 17*b* thereby completing the power circuit for solenoid 49 and tripping the control lever 36 to effect reversal of operation. Certain features of the contact elements 17*a* and 17*b*** and associated parts are disclosed and claimed in my copending application Serial No. 300,247, filed July 22, 1952.

Figure 3:
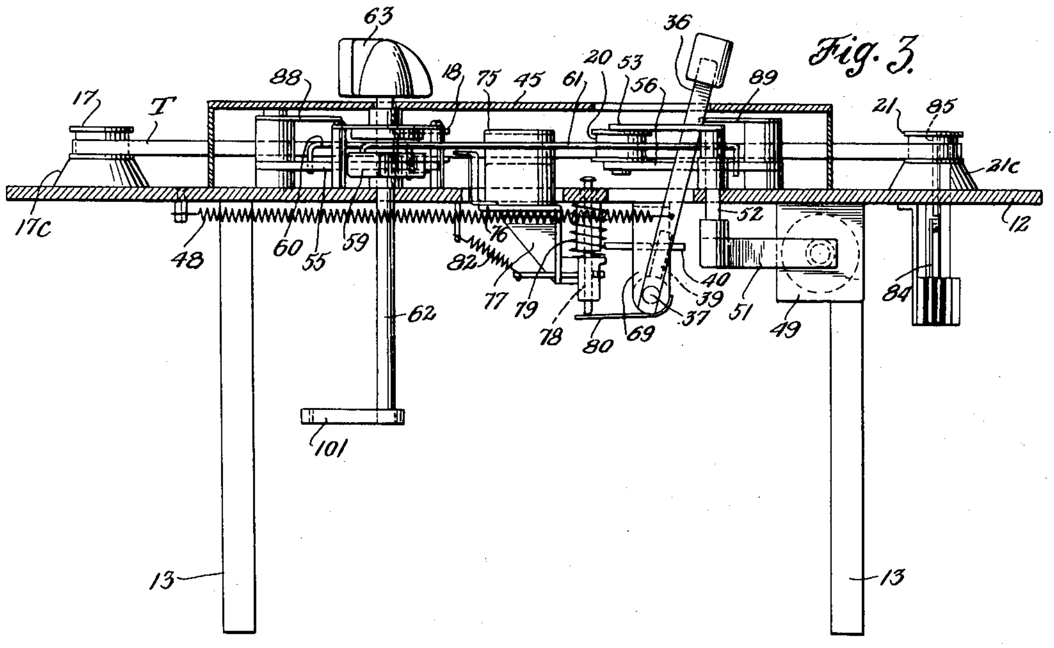
Figure 3 is a vertical sectional view taken substantially as indicated by the section line 3—3 on Figure 1.

Referring further to the mounting of the magnetic scanning head 75, it is noted that this head is yieldingly urged into engagement with the tape as it passes the capstan 19 by means of a spring 82 (see Figures 3 and 4). The head, however, is pivotally displaceable about the axis of supporting pin 78 to facilitate threading of the tape in the machine. For this purpose an abutment 83 is carried by the mounting plate 76 for the head 75 in such position as to be engaged by the bellcrank 55 when the control knob 63 is adjusted to condition the machine for threading. This is shown in Figure 5. Thus the control knob 63 not only serves to withdraw the tape guide elements 18 and 20 but further serves to displace the scanning head away from the capstan, which is also of importance in providing for the substantially straight line threading of the machine between the guide posts 17 and 21.

Attention is now called to another automatic control feature which is incorporated in the guide post 21. Associated with this guide post is a shutoff switch 84 adapted to be coupled into the circuit of the driving motor 32. The post 21 has a segment 85 which extends downwardly through the base plate 12 to form a part of switch 84, this segment being pivoted for swinging movement in a radial plane with reference to the post 21. When the tape is in engagement with the post and the segment 85 is drawn inwardly (the position shown in Figure 1) the motor circuit 32 is completed and the machine is conditioned for operation. However, in the absence of a tape passing around the guide post 21, the segment 85, which is biased to break the circuit in switch 84, causes the motor to shut off.

In analyzing the operation of the various features described, it is first noted that tape reel 15 is intended to constitute the permanent storage reel for a multiple track tape. When it is desired to reproduce such a tape, the reel 15 is placed upon the spindle 22 and the end of the tape threaded into the reel 16, which latter reel may advantageously constitute a permanent part of the machine. The control lever is then manually set to the right hand position and reproduction of the recording is commenced. The reproduction continues until the solenoid 49 is energized, whereupon the direction of drive and scanning is reversed and the tape is rewound upon the original storage reel 15. When the end of the tape passes the guide post 21 the switch controlling segment 85 effects shutoff of the driving motor.

Attention is now directed to the fact that the cover plate 45 above referred to overlies many of the parts already described including the bellcranks 55 and 56, the scanning head 75, etc. An additional cover plate 86 overlies certain adjacent parts of the machine, including the driving capstan 19 and, as clearly appears in Figure 1, a slot 87 is provided between the adjacent edges of the cover plates 45 and 86. This slot constitutes the threading slot of the machine and overlies the substantially straight run of the tape between the posts 17 and 21 shown in Figure 5 (in which the machine is conditioned for threading). On the other hand when the machine is conditioned for operation, arms 88 and 89, which are mounted for movement with the bellcranks 55 and 56, are shifted to positions in which they block the slot 87, thereby preventing threading of the machine when it is conditioned for operation. In this way damage to tape records is avoided, since the machine is virtually foolproof. Similarly it will be noted from Figure 1 that the scanning head 75 also blocks the threading slot 87. In the preferred arrangement it is contemplated that the top of the scanning head 75 and also the top surface of the blocking arms 88 and 89 be colored red for the purpose of giving a visual indication of the condition of the machine. Thus, when the user observes red areas through the threading slot 87, he is advised that the machine is not in condition for threading.

Further safeguards are provided to render the threading as foolproof as possible. For example, the guide posts 17 and 21 not only have recesses adapted to engage the tape, but further have lower inclined or conical parts **17*c* and 21*c* which provide what in effect is a self-centering guiding action. In this way it is not necessary to accurately thread the tape into the grooves of the posts 17 and 21, but the tape may merely be laid on the base plate 12 around the posts, and then upon starting of the machine the tape will automatically find its way into the proper position on the guide posts. A further safety feature comprises fingers 90 and 91 (see Figures 4 and 5) which extend from the bellcranks 55 and 56 so as to lie under the tape in the region of the threading slot 87. These fingers (90 and 91) may be shaped to automatically raise the tape somewhat upon forward movement of the bellcranks, to thereby ensure proper engagement of the tape with guide elements 18 and 20 and also with the drive capstan 19**.

Reference is here made to the modified tape guide element shown in Figure 10. As there seen, a guide element **18*a*** has a body portion with an inclined surface for supporting the tape, the guide further having a flange to engage an edge of the tape, to thereby accurately position the tape edgewise. Such a tape guide may be either rotative or fixed and is of especial advantage when used in the region of the tape path adjacent the scanning head, since when so used it serves to ensure accurate scanning of the desired track on the tape.

When the advance end of a tape is being threaded from reel 15 to reel 16, after it is dropped into the threading slot 87, the end portion is merely laid in one or another of the grooves 92 formed in the central hub of the reel 16, and the reel 16 is given a turn or two, after which operation may commence.

Figure 2:
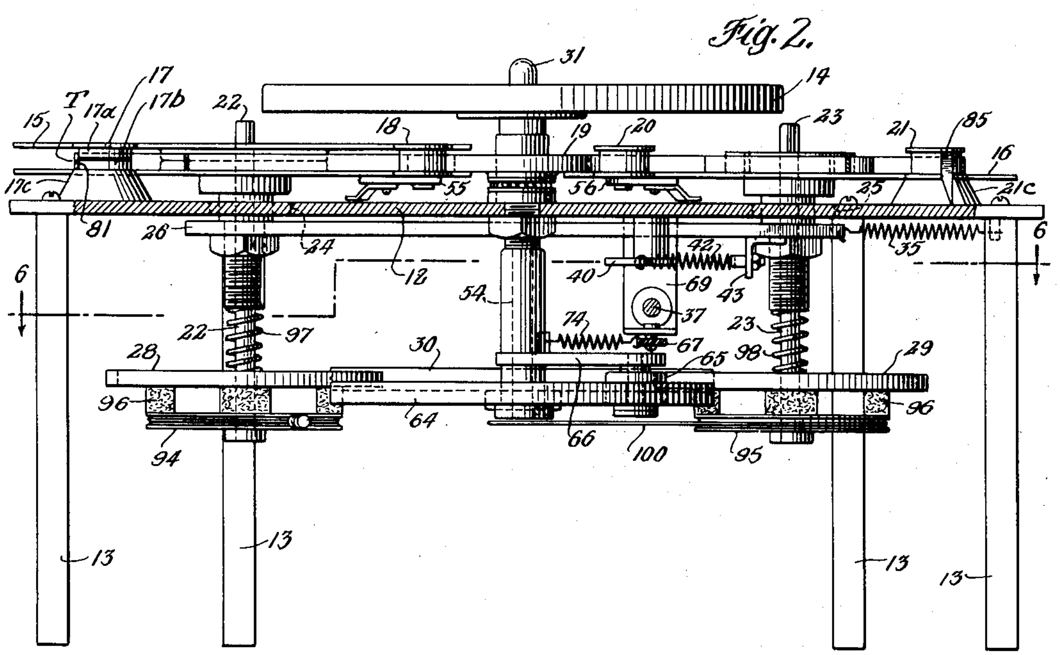
Figure 2 is a vertical sectional view taken substantially as indicated by the section line 2—2 on Figure 1.

Still another safety feature of the machine illustrated comprises means for braking rotation of the tape reels 15 and 16. This feature is best illustrated in Figures 2 and 6. As there shown, a pulley 94 is fixed on the spindle 22 for reel 15, and a similar pulley 95 is fixed on spindle 23 of reel 16. Friction pads 96 are interposed between the pulley 94 and the drive disc 28 and also between the pulley 95 and the drive disc 29. It is here pointed out that the drive from the discs 28 and 29 to the posts 22 and 23, respectively, is effected through the friction elements 96 which, in effect, constitute slip clutches. The disk 28 is yieldingly urged against the friction elements 96 by means of a spring 97, and similarly a spring 98 yieldingly urges the disc 29 against the friction elements 96 which are arranged on the other reel shaft. These friction clutches perform an important function referred to below.

A friction cord brake 99 is associated with pulley 94 and a similar cord 100 is associated with pulley 95, the two cords being connected with arm 101 through springs 102 and 103 respectively. The arm 101 is fixed to shaft 62 of control knob 63, and these parts are all arranged so that when the control knob is adjusted to condition the machine for threading, an appreciable braking force is applied to the pulleys 94 and 95. Thereby spinning of the reels is prevented. This is of importance since spinning of a reel at the time of threading and in a direction to unwind a tape, can readily result in knotting, kinking or tearing of the tape. When the control knob 63 is adjusted for operation, however, the friction brake cords 99 and 100 are released sufficiently to avoid imposing any appreciable drag on the drive of either of the tape reels. Certain features of the reel brakes are disclosed and claimed in my copending application Serial No. 369,880, filed July 23, 1953.

Attention is now directed to the fact that it is contemplated according to the invention that drive capstan 19 shall be the controlling influence in determining the rate of feed of the tape. The drive of one tape reel or the other (depending upon the direction of operation) is arranged to overrun the drive of the capstan, but the tape reel drives incorporate the slip clutch elements 96, and therefore during operation in either direction the reel being driven merely establishes slight tension in the run of the tape going back to the drive capstan.

A further feature of importance resides in the fact that the control knob 63 may be adjusted to an intermediate position, i. e., a position intermediate that provided for threading of the machine and that provided for normal operation of the machine. In the intermediate position (about midway between the other two positions) the bellcranks 55 and 56 are withdrawn sufficiently to permit the tape to become substantially disengaged from the drive capstan 19. In this condition it is contemplated that the control lever 36 be moved to the left, whereupon rewinding of any portion of the tape which had been transferred to reel 16 will occur. This rewinding will take place at a relatively rapid rate, i. e., five to ten times the normal scanning rate, depending upon the relative diameter of the several friction driving discs in the system. The reason why this rewinding will occur quite rapidly is that without the drag of the driving capstan 19 on the tape, the slip clutch 96 in the reel drive will not slip but will establish the rate of rewind. Therefore since the reel drives are arranged to overrun the capstan driving, rewinding may be effected in a short time.

Another feature of importance is the fact that the high speed rewinding may be effected in either direction of operation, so that almost any selected portion of a tape recording may quickly be reached for playback. In the intermediate position of adjustment of the knob 63 the braking force of the friction brake cords 99 and 100 will be only lightly applied, so as not to interfere with the rapid rewinding.

According to the foregoing, a machine is provided for handling magnetic tape records in an extremely simple and foolproof manner. The equipment may be employed either for recording or reproduction, as has already been brought out. As is known in this art, a magnetic scanning device such as indicated at 75, may comprise a generally U-shaped magnetic core having small pole pieces with a very narrow flux gap therebetween. The core carries windings which may alternatively be employed either for purposes of making a recording or for the purpose of reproduction, in one event the windings being coupled to the output of a power amplifier and in the other event to the input thereof.

The association of the various devices for handling the magnetic tape records with a standard disc record player, including turntable 14 is also of especial advantage and an important point in this connection is that according to the invention all of these parts are arranged in an exceptionally compact manner, it being noted that the tape reels 15 and 16 are arranged to lie in part below the turntable 14.

This application is a continuation of my application Serial No. 742,776, filed April 21, 1947.

I claim:

1. A machine for use with elongated magnetic tape records adapted to be fed from one reel to another, comprising guide means normally establishing a feed path, a portion of which is sinuous, record driving means adapted to cooperate with a record in the sinuous portion of the feed path, and a magnetic scanning device and a cooperating backing member for maintaining interengagement of the scanning device and record, the scanning device and backing member being relatively separable in a direction toward and away from the opposite side faces of a tape record to facilitate threading of a record in the machine, and the guide means being displaceable to provide substantially straight-line threading of a record in said portion of the feed path which is normally sinuous.

2. A construction according to claim 1 and further including common control means for relatively separating the scanning device and backing member and displacing the guide means.

3. In a machine for use with elongated magnetic records adapted to be fed from one reel to another, record feeding mechanism arranged along the path of feed between the reels and including elements shiftably movable toward and away from each other to alternatively condition the machine for record threading and for operation, an enclosure for said mechanism having a record threading slot therein positioned to guide a record between said elements when shifted away from each other, a displaceable member for blocking said slot, and a control interlock coordinating movement of said member and of said elements.

4. In a machine for use with elongated magnetic records adapted to be fed from one reel to another, record feeding mechanism arranged along the path of feed between the reels and including elements shiftably movable toward and away from each other to alternatively condition the machine for record threading and for operation, an enclosure for said mechanism having a record threading slot therein positioned to guide a record between said elements when shifted away from each other, a signal device visible through said slot and operable to indicate the condition of the feed mechanism, and a control interlock coordinating operation of the signal device with the shifting movement of said elements.

5. Equipment for use with magnetic tape records comprising a pair of reel mounting spindles spaced from each other in a common plane and arranged parallel to each other for supporting a pair of reels of a given size between which a tape record is adapted to be fed, a pair of spaced tape guides arranged in a plane substantially parallel to but offset from the plane of the reel spindles a distance at least as great as the radius of a reel, a magnetic scanning device arranged at one side of the feed path between said spaced guides, a backing member at the opposite side of the feed path, the scanning device and backing member being relatively displaceable toward and away from each other, a spring for urging the scanning device and backing member into interengagement to grip a tape record therebetween for scanning purposes, and a control for relatively displacing the scanning device and backing member to provide for edgewise threading of a tape therebetween substantially in said offset plane of said spaced guides.

6. Equipment for use with magnetic tape records comprising a pair of reel mounting spindles spaced from each other in a common plane and arranged parallel to each other for supporting a pair of reels of a given size between which a tape record is adapted to be fed, a pair of tape threading guides having elongated guide edges spaced from each other to provide a tape threading slot adapted to receive a tape edgewise, said guide edges being extended in a direction generally paralleling the plane of the reel spindles but being offset from said plane a distance at least equal to the radius of a reel so that said edgewise threading of a tape into the slot may be effected at a location beyond the periphery of the reels, and tape engaging members comprising a magnetic scanning head and a backing element therefor arranged at opposite sides of the feed path in the region of said slot, said scanning head and backing element being relatively displaceable toward and away from each other in a direction transverse of said slot to alternatively engage and release a tape, and being adapted to receive a tape threaded edgewise through the slot when the scanning head and backing element are displaced from each other.

7. Equipment for use with magnetic tape records adapted to be fed from one reel to another, comprising a support for such equipment having a pair of reel mounting spindles projecting therefrom, a tape driving capstan also projecting from the support in position to engage a tape in the path of feed thereof between the reels, a tape guide mounted on the support and movable between a position providing for holding a tape in driving engagement with the capstan and a displaced position which releases said driving engagement, and a magnetic scanning device mounted on said support and movable toward and away from the capstan between a position in engagement with a tape on the capstan and a displaced position spaced therefrom, the displaced positions of said guide and said scanning device providing for threading of a tape record in the equipment.

8. A construction according to claim 7 and further including a control having operating connections with both said guide and said scanning device providing for concurrent displacement thereof to facilitate threading of a tape record in the equipment.

9. A construction according to claim 7 in which a pair of displaceable guides are provided, one positioned toward each side of the capstan and providing for engagement of a tape with the capstan throughout an appreciable arc thereof, whereby upon displacement of side guides and said scanning device substantially straightline threading of a tape may be effected in the region of the capstan.

10. A construction according to claim 6 in which the scanning head and backing element are located directly opposite to each other at opposite sides of the tape feed path, and further including means providing for yielding gripping of a tape record between the scanning head and backing element when the scanning head and backing element are moved toward each other.

11. In a machine for use with an elongated magnetic record adapted to be fed between a pair of reels, a record guiding member on which a record is adapted to be threaded in its path of feed between the reels, said member having a segment yieldingly urged against a record threaded thereon, and an electric control switch for the machine associated with said segment and operated thereby according to whether a record is or is not threaded on said guiding member.

12. A machine for use with elongated magnetic tape records comprising, in combination with a pair of reels between which a tape record is adapted to be fed, disengageable slip drives for each of the reels arranged to wind up the tape thereon at relatively high speed, a control for alternatively activating said slip drives, a disengageable low speed drive mechanism for engaging a tape in the path of feed between the reels, and mechanism for reversing the said low speed drive mechanism, whereby a tape record may be fed in either direction either at the low speed established by said drive mechanism or at the high speed established by said slip drives.

13. Equipment for use with magnetic tape records comprising a pair of reel mounting spindles spaced from each other in a common plane and arranged parallel to each other for supporting a pair of reels of a given size between which a tape record is adapted to be fed, a pair of tape threading guides having elongated guide edges spaced from each other to provide a tape threading slot adapted to receive a tape edgewise, said slot, throughout its whole length, generally paralleling the plane of the reel spindles but being offset from said plane a distance at least equal to the radius of a reel so that said edgewise threading of a tape into the slot may be effected at a location beyond the periphery of the reels, and tape engaging members comprising a magnetic scanning head and a backing element therefor arranged at opposite sides of the feed path in the region of said slot, said scanning head and backing element being relatively displaceable toward and away from each other in a direction transverse of said slot to alternatively engage and release a tape, and being adapted to receive a tape threaded edgewise through the slot when the scanning head and backing element are displaced from each other, said equipment being configured to provide two manually accessible spaces communicating with and extending onwardly from the respective ends of the slot for sufficient distances in alignment with the slot to accommodate, at locations substantially so aligned, manual grasp of the tape at the two ends of a length thereof during edgewise insertion of said length through the slot and its reception between the displaced scanning head and backing element.

14. Equipment for use with magnetic tape records comprising a pair of reel mounting spindles spaced from each other in a common plane and arranged parallel to each other for supporting a pair of reels of a given size between which a tape record is adapted to be fed, a pair of tape threading guides having elongated guide edges spaced from each other to provide a tape threading slot adapted to receive a tape edgewise, said slot being straight and generally paralleling the plane of the reel spindles but being offset from said plane a distance at least equal to the radius of a reel so that said edgewise threading of a tape into the slot may be effected at a location beyond the periphery of the reels, and tape engaging members comprising a magnetic scanning head and a backing element therefor arranged at opposite sides of the feed path in the region of said slot, said scanning head and backing element being relatively displaceable toward and away from each other in a direction transverse of said slot to alternatively engage and release a tape, and being adapted to receive a tape threaded edgewise through the slot when the scanning head and backing element are displaced from each other, said equipment being configured to provide two manually accessible spaces communicating with and extending onwardly from the respective ends of the slot for sufficient distances in alignment with the slot to accommodate, at locations substantially so aligned, manual grasp of the tape at the two ends of a length thereof during edgewise insertion of said length in straight condition through the slot and its reception between the displaced scanning head and backing element.

15. A machine for use with elongated magnetic tape wound on reels, comprising means for supporting a pair of said reels with the tape leading from one to the other; tape engaging elements along the tape between said reels including a driving capstan and a magnetic scanning head, said elements confining an inter-reel run of the tape in a scanning feed path with the tape in driving engagement with the capstan and in sliding contact with the head as the tape is fed from one reel to the other, and certain of said elements being respectively located at the two sides of the tape and being relatively movable to release the confinement of said inter-reel run of the tape and to open a threading path between and along said elements; a cover structure extending along said threading path, said structure having therein an elongated tape threading slot through which a tape may be inserted edgewise into said threading path, said slot being sufficiently straight to permit a plane directed lengthwise thereof and to the threading path to extend therethrough, and said machine being configured to have two spaces, adjacent said cover structure and into which said slot opens at its respective ends, adapted to receive at said plane respective pairs of manual fingers grasping the tape between them, whereby to allow a straight length of the tape held between the hands to be inserted edgewise through the slot to the threading path.

16. A machine for use with elongated magnetic tape records comprising means for supporting a pair of reels between which a magnetic tape record is adapted to be fed along a scanning feed path, apparatus for magnetic scanning comprising a magnetic scanning head and means providing for continuous intimate contact of the tape with the head as the tape is fed past the head for scanning, said apparatus including elements at the two sides of the tape in said scanning feed path relatively displaceable to alternatively engage and release a tape, a pair of tape threading guides having elongated guide edges spaced from each other and providing a threading slot therebetween for edgewise insertion of a length of the tape, said slot being straight and being located to guide the inserted length of tape to the space between said relatively displaceable elements when the same are displaced for tape release, said machine being configured to provide two manually accessible spaces communicating with and extending onwardly from the respective ends of the slot for sufficient distances in alignment with the slot to accommodate, at locations substantially so aligned, manual grasp of the tape at the two ends of a length thereof during edgewise insertion of said length in straight condition through the slot and its reception between the displaced scanning head and backing element.

References Cited in the file of this patent

UNITED STATES PATENTS

| | | |
|---|---|---|
| 909,414 | Hytten | Jan. 12, 1909 |
| 1,223,771 | Day | Apr. 24, 1917 |
| 1,560,721 | O'Reilly | Nov. 10, 1925 |
| 1,802,595 | DeForest | Apr. 28, 1931 |
| 1,944,037 | Proctor | Jan. 16, 1934 |
| 1,952,809 | Kuchenmeister | Mar. 27, 1934 |
| 2,019,260 | Howell | Oct. 29, 1935 |
| 2,032,184 | Schiffl | Feb. 25, 1936 |
| 2,051,036 | Foster | Aug. 18, 1936 |
| 2,096,805 | Hickman | Oct. 26, 1937 |
| 2,102,895 | Hasbrouck | Dec. 21, 1937 |
| 2,153,214 | Tondreau | Apr. 4, 1939 |
| 2,196,730 | Hooker | Apr. 9, 1940 |
| 2,259,715 | Woolf | Oct. 21, 1941 |
| 2,275,961 | Heller | Mar. 10, 1942 |
| 2,294,854 | Steed | Sept. 1, 1942 |
| 2,296,845 | Goetz | Sept. 29, 1942 |
| 2,335,277 | Heller | Nov. 30, 1943 |
| 2,351,005 | Camras | June 13, 1944 |
| 2,413,051 | Iborra | Dec. 24, 1946 |
| 2,416,606 | Zimmerman | Feb. 25, 1947 |
| 2,419,476 | Begun | Apr. 22, 1947 |
| 2,422,143 | Somers | June 10, 1947 |
| 2,429,703 | Vagtborg | Oct. 28, 1947 |
| 2,455,187 | Owens | Nov. 30, 1948 |
| 2,467,507 | Stone | Apr. 19, 1949 |
| 2,468,198 | Heller | Apr. 26, 1949 |
| 2,495,125 | Nemeth | Jan. 17, 1950 |
| 2,500,903 | Neff | Mar. 14, 1950 |
| 2,501,573 | McLouth | Mar. 21, 1950 |
| 2,504,587 | Rey | Apr. 18, 1950 |
| 2,513,423 | Owens | July 4, 1950 |
| 2,526,783 | Toogood | Oct. 24, 1950 |
| 2,535,486 | Dank | Dec. 26, 1950 |
| 2,535,498 | Kornei | Dec. 26, 1950 |
| 2,536,666 | Somers | Jan. 2, 1951 |
| 2,538,892 | Begun | Jan. 23, 1951 |
| 2,538,893 | Begun | Jan. 23, 1951 |
| 2,538,981 | Ross | Jan. 23, 1951 |
| 2,540,299 | Shoup | Feb. 6, 1951 |
| 2,558,432 | Haloski | June 26, 1951 |
| 2,563,545 | Moreland | Aug. 7, 1951 |
| 2,639,333 | Howell | May 19, 1953 |

FOREIGN PATENTS

| | | |
|---|---|---|
| 7,292 | Great Britain | Mar. 28, 1904 |
| 69,273 | Norway | May 28, 1945 |
| 544,760 | Great Britain | Apr. 27, 1942 |

OTHER REFERENCES

A. C. Shaney, pages 60–63, Figures 11–3, 11–6 and 11–7. (Available in Div. 16.)